No. 687,649. Patented Nov. 26, 1901.
A. PASCOCELLO.
STEEPLECHASE OR HURDLE FENCE.
(Application filed May 28, 1901.)
(No Model.)
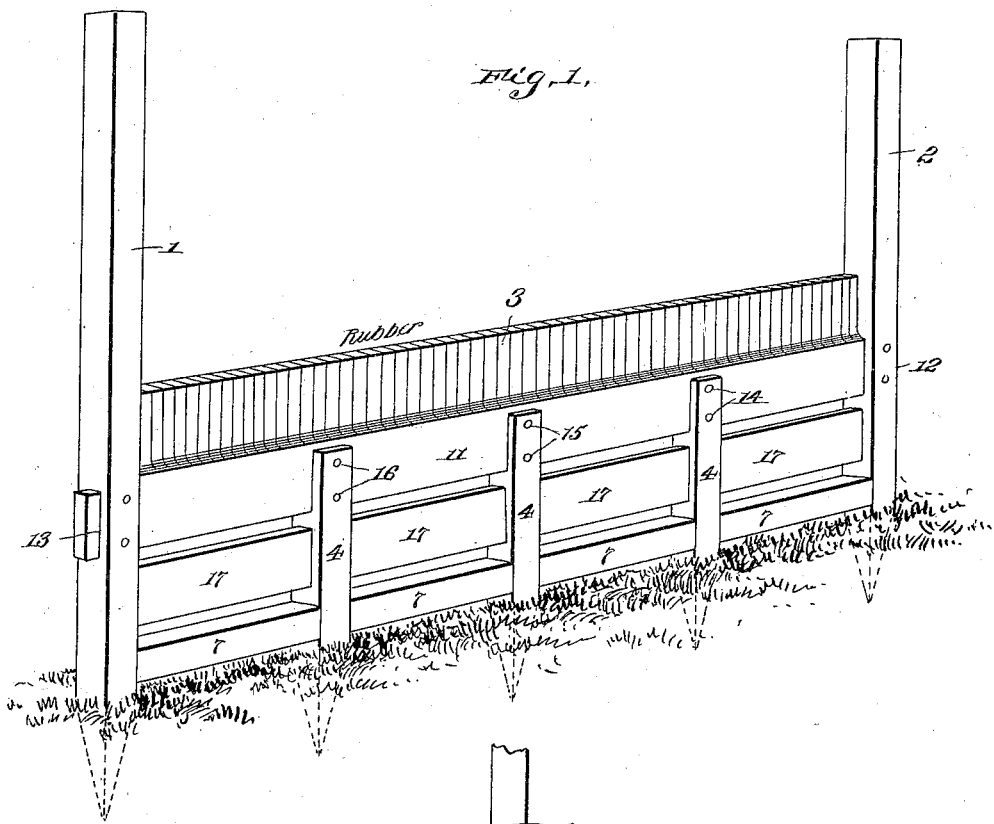
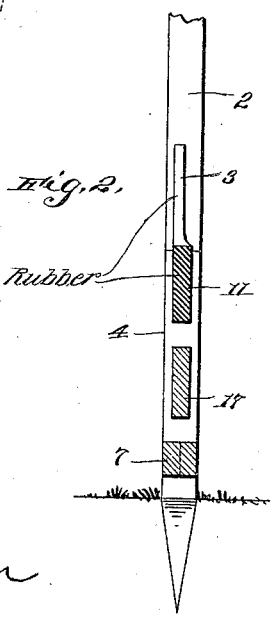

UNITED STATES PATENT OFFICE.

ANTONIO PASCOCELLO, OF NEW YORK, N. Y.

STEEPLECHASE OR HURDLE FENCE.

SPECIFICATION forming part of Letters Patent No. 687,649, dated November 26, 1901.

Application filed May 28, 1901. Serial No. 62,225. (No model.)

*To all whom it may concern:*

Be it known that I, ANTONIO PASCOCELLO, a citizen of the United States, residing in the city of New York, borough of Manhattan, county of New York, and State of New York, have invented an Improved Hurdle, of which the following is a full description.

My invention is an improvement in that class of hurdle or steeplechase fences in which the upper portion is composed of yielding material, commonly brush or branches of trees. In my improved hurdle the upper portion is composed of a piece of rubber, which preferably extends from post to post and is provided on its upper edge with a series of vertical fingers, whereby a horse failing to clear the fence will strike one or more of the yielding fingers and thereby be saved from falling or stumbling in passing over the hurdle. The rubber fingers or pieces return to place after being struck and bent over.

The details of construction and arrangement are as follows.

In the accompanying drawings, Figure 1 is a perspective view of my improved hurdle or steeplechase fence, and Fig. 2 is a transverse vertical section.

The frame or removable portions of the hurdle consist of two tall exterior guide-posts 1 and 2, a series of short intermediate posts 4 and two horizontal bars 7 and 17. The two guide-posts 1 and 2 are spaced apart the distance required for the length of a hurdle. The wooden bars 7 and 17 are spaced apart vertically and mortised into the guide-posts 1 and 2 and also suitably secured thereto. The said bars pass through slots or mortises in the short posts 4, to which they are also suitably pinned. The upper ends of the short posts 4 are provided with open slots to receive the rubber bar 11, whose ends 12 and 13 project through slots or mortises in the guide-posts 1 and 2. The ends of the rubber bar are secured to the posts 1 and 2 by means of clamp-screws, and rivets or screws 14, 15, and 16 are also employed for securing it to the short posts 4. The said rubber bar 11 is provided with a series of vertical fingers 3, which are arranged in horizontal alinement. These fingers are formed by a series of vertical slits, as shown. The entire upper portion, constituting the fingers 3, is reduced in thickness, as shown, so that the fingers may have the required elasticity while the body of the bar 11 has due rigidity. The bar 11 and its fingers 3 are preferably composed of soft rubber, which, however, may be vulcanized or hardened to a certain degree, if desired. It will be seen that the frame composed of the guide-posts 1 and 2, the intermediate posts 4, and the connecting horizontal bars 7 and 17 constitutes a rigid framework which furnishes an adequate rigid support for the flexible member 11 and elastic fingers 3.

In practical use if a horse in jumping the hurdle chances to strike one of the fingers or stubs 3 the latter will yield, so that the horse will be prevented from tripping and being thrown with the rider, thus preventing injury to the horse or rider and avoiding possible loss of the race.

Having thus described my invention, what I claim as new, and desire to secure by Letters Patent, is—

1. The improved hurdle comprising a framework which furnishes a duly rigid support, and a top bar having a series of rubber fingers, substantially as shown and described.

2. The improved hurdle comprising a framework forming a duly rigid support, and a top bar consisting of rubber having a series of fingers formed integrally therewith, substantially as shown and described.

3. The improved hurdle comprising end guide-posts, and short intermediate posts, rigid horizontal bars connecting the said posts, and a top bar composed of rubber having a series of fingers formed of the same material, the said bar being supported in and attached to the short posts, substantially as shown and described.

4. The improved hurdle comprising vertical guide-posts, a series of short intermediate posts having their upper ends slotted, horizontal connecting-bars, and the top bar consisting of the base portion which rests in the slots of the short posts and is duly connected to the guide-posts, the said bar being provided with a series of vertical elastic fingers formed integrally therewith and reduced in thickness as shown and described.

In testimony whereof I have signed my name to this specification, in the presence of two subscribing witnesses, this 24th day of May, 1901.

ANTONIO PASCOCELLO.

Witnesses:
ROCCO LAMBERTI,
PASQUALE FRANCESCO.